United States Patent

Vieler

[11] Patent Number: 5,143,474
[45] Date of Patent: Sep. 1, 1992

[54] CONNECTOR FOR PROFILED MEMBERS

[75] Inventor: Gerd Vieler, Iserlohn, Fed. Rep. of Germany

[73] Assignee: Gerd und Bernd Vieler KG, Iserlohn, Fed. Rep. of Germany

[21] Appl. No.: 562,484

[22] Filed: Aug. 3, 1990

[30] Foreign Application Priority Data

Aug. 11, 1989 [DE] Fed. Rep. of Germany ....... 3926598
Jan. 18, 1990 [DE] Fed. Rep. of Germany ....... 4001317
Apr. 18, 1990 [DE] Fed. Rep. of Germany ....... 4012332

[51] Int. Cl.[5] ................................. F16B 7/04
[52] U.S. Cl. .................... 403/252; 403/254; 403/187
[58] Field of Search ............... 403/255, 254, 253, 252, 403/256, 231, 196, 194, 201, 187

[56] References Cited

U.S. PATENT DOCUMENTS 4,799,819 1/1989 Swoboda ........................... 403/252

FOREIGN PATENT DOCUMENTS 3153232 3/1986 Fed. Rep. of Germany .

Primary Examiner—Andrew V. Kundrat
Attorney, Agent, or Firm—Peter K. Kontler

[57] ABSTRACT

A connector which can separably couple a hollow first profiled member with a channeled second profiled member has an open-ended housing for a reciprocable clawed coupling member and an eccentric which is rotatable to move the coupling member between extended and retracted positions. The coupling member has a front projection which can be pushed by a disc of the eccentric to move the coupling member to extended position in which the claw or claws of the coupling member can enter a channel of the second profiled member. The coupling member further includes a rear projection which can be pushed by the disc to move the coupling member to the retracted position in which the claw or claws bear against an internal surface of the second profiled member and urge an outer side of the second profiled member against the adjacent end of the first profiled member. The rear projection is part of a looped rear end portion of the substantially plate like coupling member. The rear end portion can form a U-shaped loop or a complete loop.

31 Claims, 7 Drawing Sheets

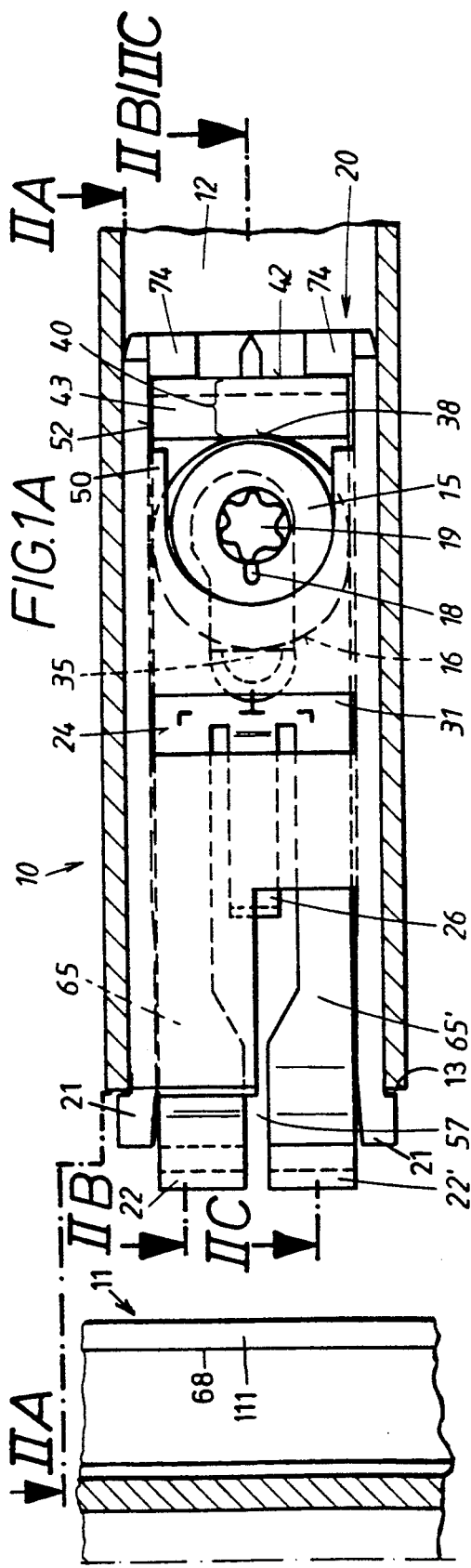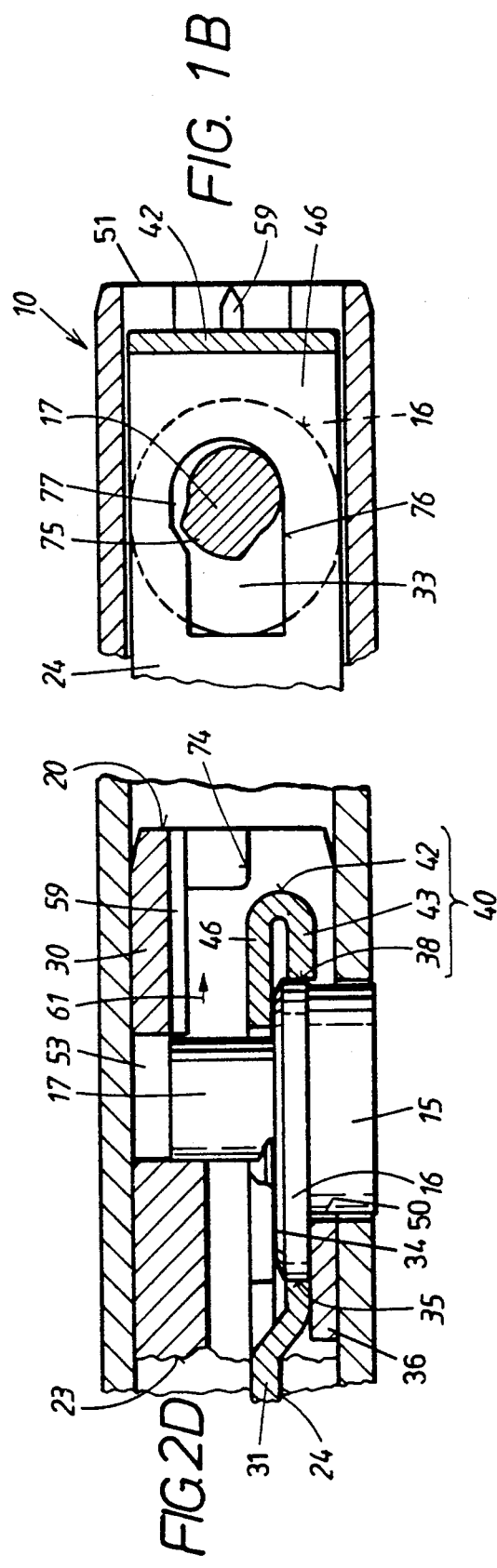

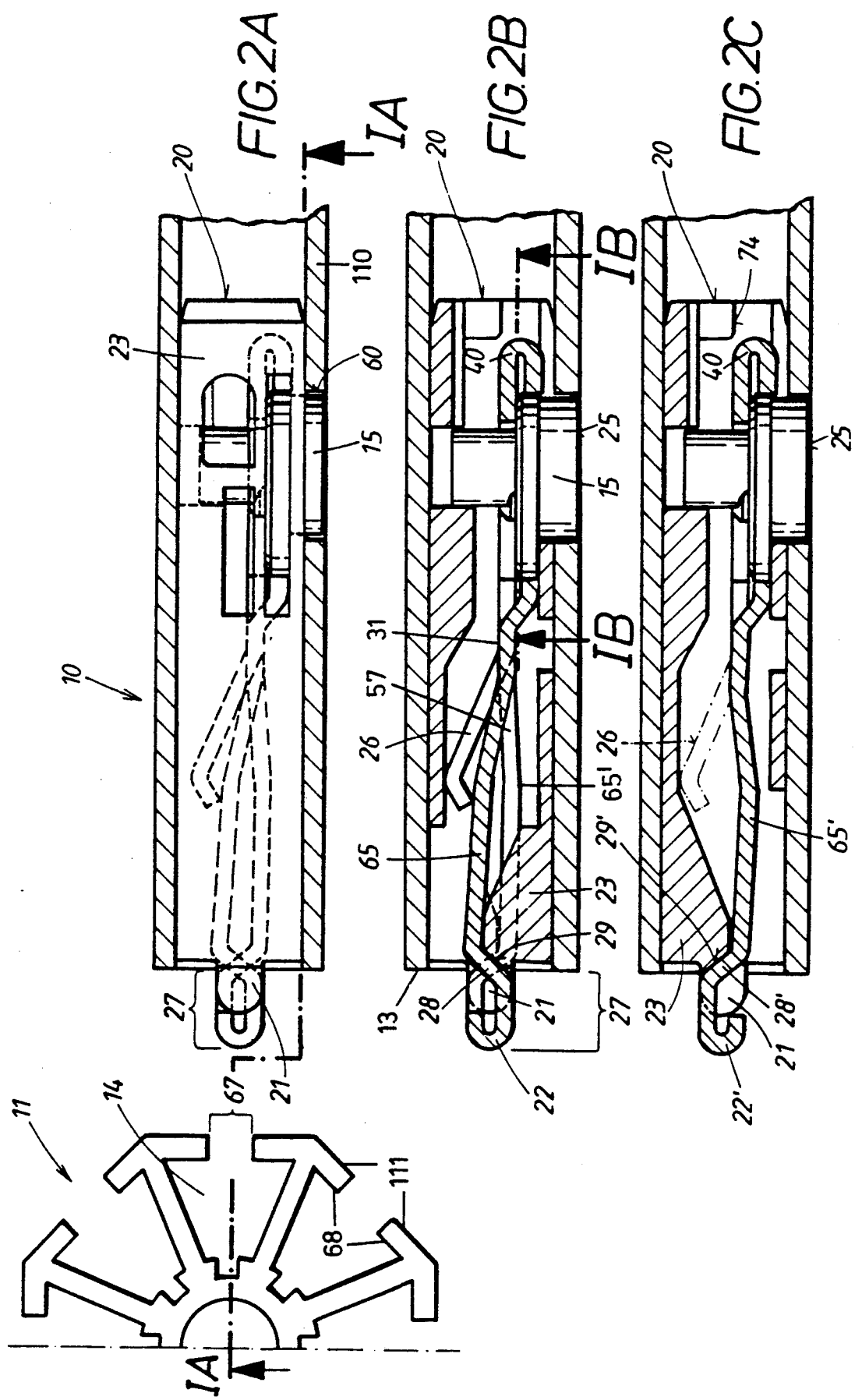

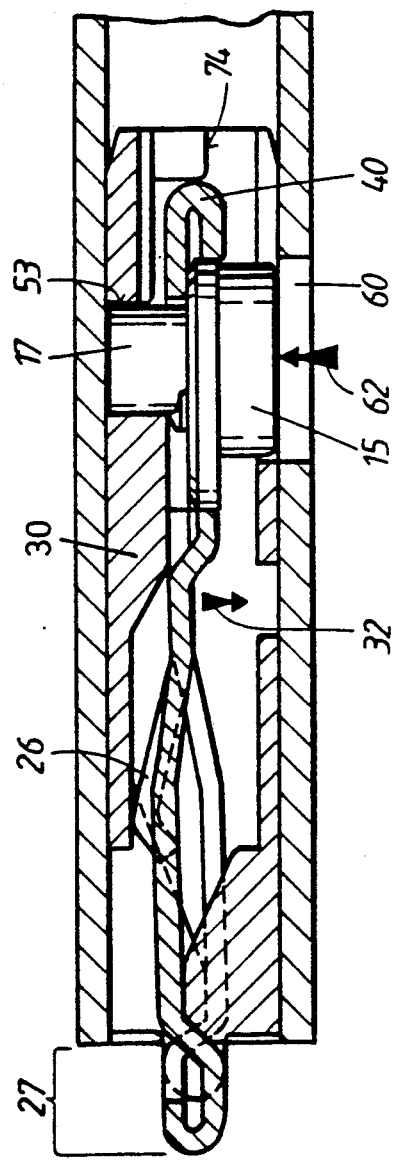
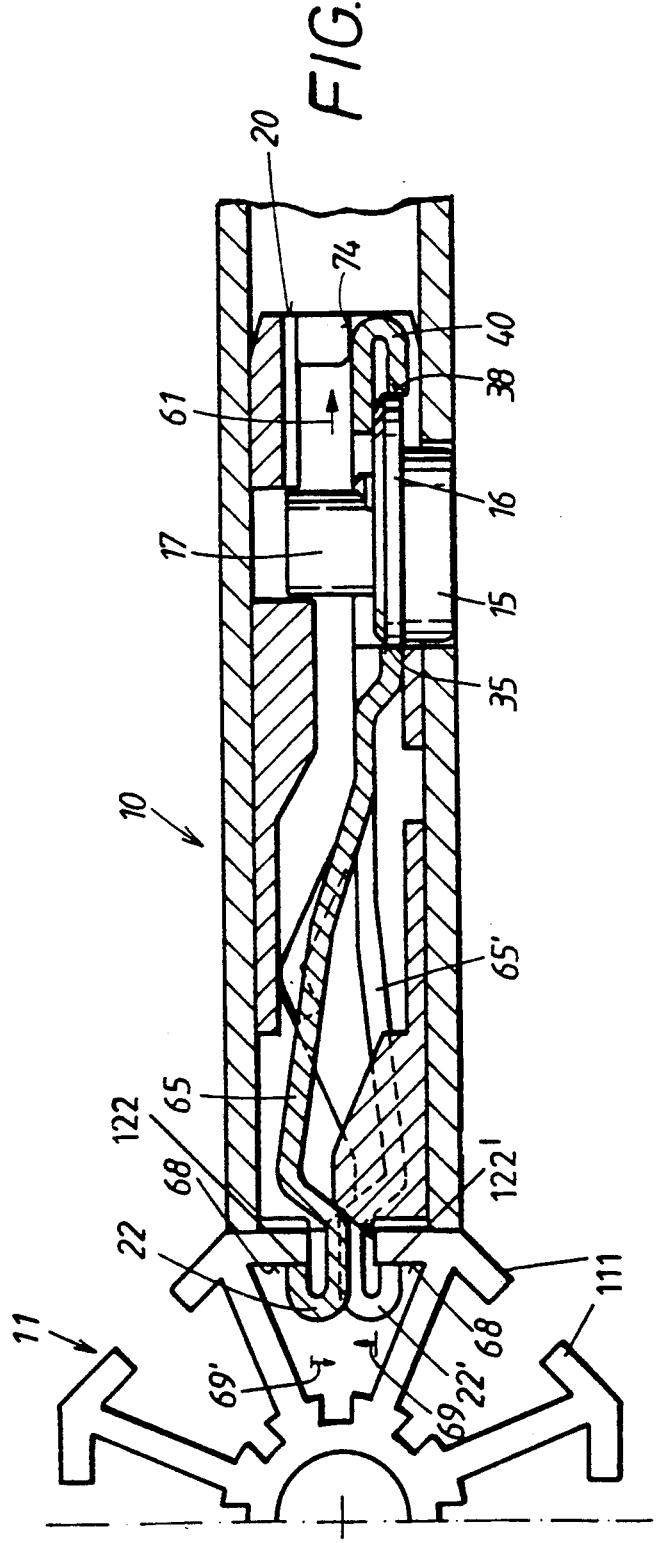

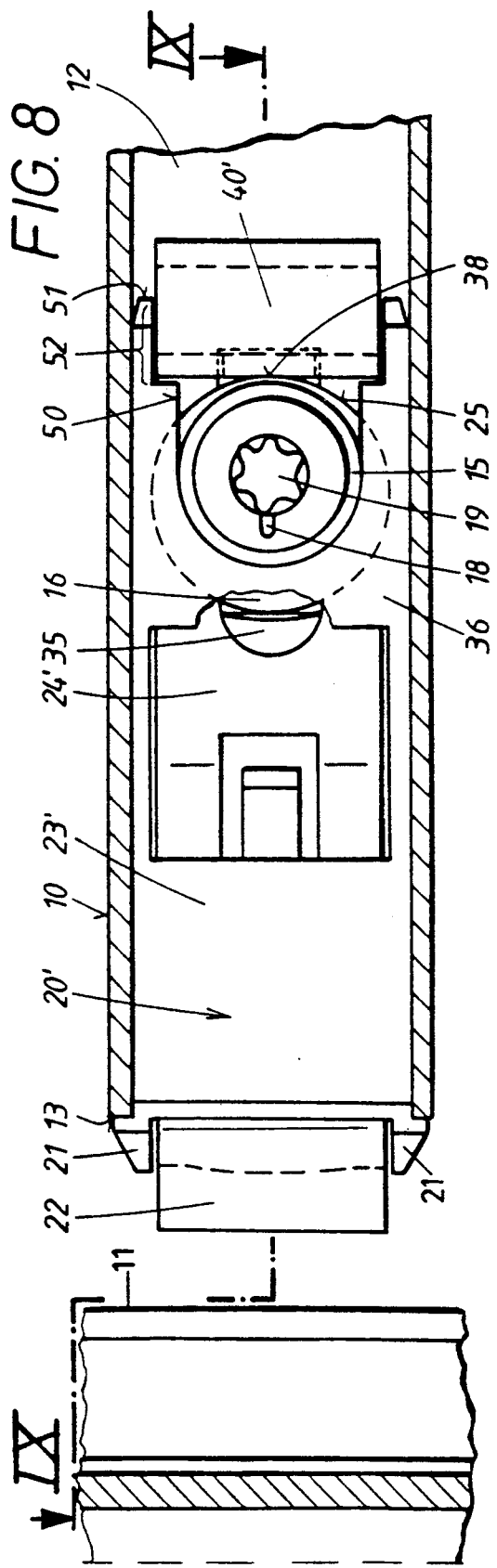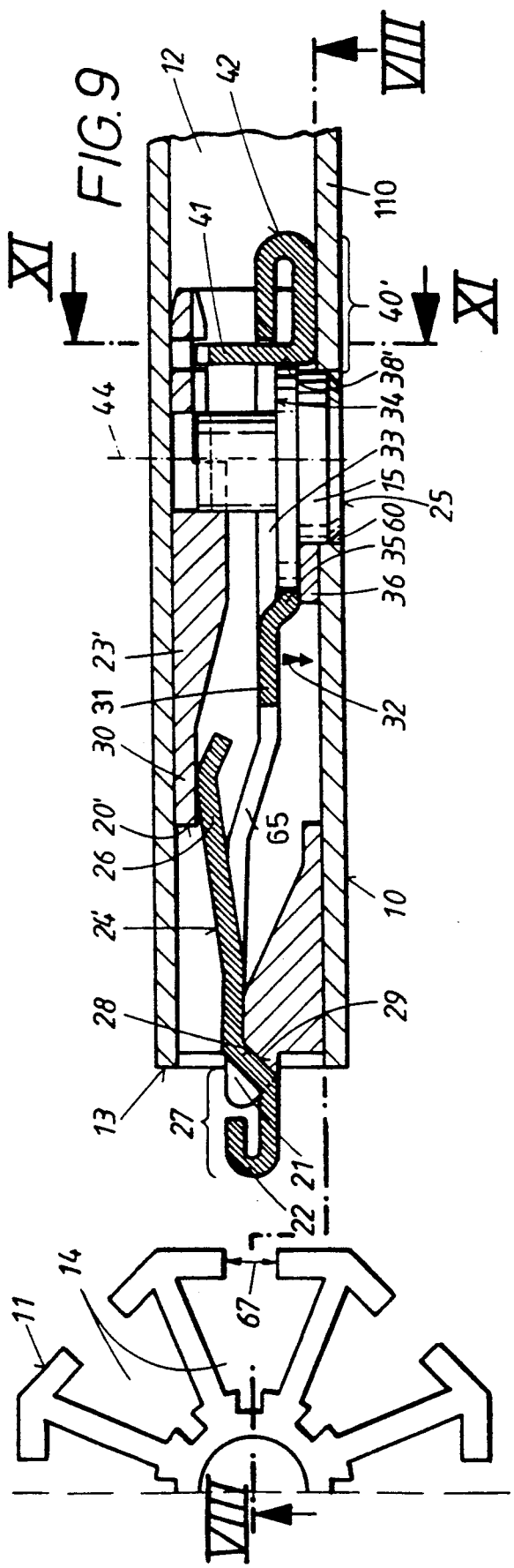

CONNECTOR FOR PROFILED MEMBERS

CROSS-REFERENCE TO RELATED CASE

The coupling device of the present invention is similar to that which is described and shown in commonly owned copending patent application Ser. No. 07/562,482 filed Aug. 3, 1990 by Gerd Vieler for "Device for separably coupling profiled members".

BACKGROUND OF THE INVENTION

The invention relates to improvements in devices for separably coupling profiled members. More particularly, the invention relates to improvements in connectors of the type wherein a housing can be inserted into a hollow first profiled member and confines a reciprocable coupling member with one or more claws serving to engage the internal surface of a wall of a second profiled member in order to urge the outer side of such wall against one end of the first profiled member.

German Pat. No. 31 53 232 discloses a connector wherein the coupling member is movable relative to the housing in response to rotation of an eccentric which is journalled in the housing. The eccentric is installed between two projections of the coupling member in such a way that one projection is acted upon when the eccentric is caused to turn in a first direction and that the other projection is acted upon when the eccentric is caused to turn in a second direction counter to the first direction. The one projection is located between the claw and the eccentric and is acted upon for the purpose of disengaging the claw or claws for a wall of the second profiled member. The other projection is constituted by an L-shaped portion of the coupling member and is acted upon when the claw or claws are moved toward and while the claw or claws bear against the internal surface of a wall forming part of the second profiled member. A drawback of the patented connector is that the L-shaped other or rear projection is likely to yield in response to pronounced stresses and to thus permit a loosening of the connection with attendant danger and likelihood of accident, damage and/or injury. Moreover, fatigue of the material of the L-shaped projection is likely to cause breakage, chipping or cracking which, too, can lead to accidents, damage and/or injury. Since the major part of the coupling member is confined in the housing of the patented connector and the major part of the housing is confined in the first coupling member, damage to or excessive deformation of the L-shaped projection is not readily detectable unless the connector is removed from the respective profiled member and the coupling member is withdrawn from the housing for the sole purpose of inspecting the condition of the coupling member, especially of its projections.

Swoboda U.S. Pat. No. 4,799,819 discloses a connector wherein the coupling member is a U-shaped body and the eccentric acts upon the web of the U-shaped body by way of specially designed motion transmitting parts. The patented connector comprises a substantial number of parts.

OBJECTS OF THE INVENTION

An object of the invention is to provide a connector wherein a simple, compact and inexpensive coupling member can stand pronounced stresses during movement of its claw or claws toward and into engagement as well as during engagement with a profiled member.

Another object of the invention is to provide a connector wherein the rear projection of the coupling member can be reinforced in a simple and inexpensive way.

A further object of the invention is to provide a connector which need not be repeatedly taken apart for the sole purpose of inspecting its coupling member.

An additional object of the invention is to provide a simple, compact and inexpensive connector which comprises a small number of parts and which can be utilized as a superior substitute for heretofore known connectors to separably couple profiled members consisting of aluminum or other metallic material.

Still another object of the invention is to provide a connector which can stand long periods of repeated use without damage to its coupling member.

A further object of the invention is to provide a novel and improved method of making a coupling member for use in the above outlined connector.

Another object of the invention is to provide a novel and improved housing for use with the above outlined coupling member.

An additional object of the invention is to provide a collapsible frame which consists of two or more profiled members and one or more connectors embodying the above outlined features and serving to separably couple the profiled members to each other.

A further object of the invention is to provide a connector which can be rapidly installed in and rapidly detached from a profiled member.

Another object of the invention is to provide a connector which can be detached from a profiled member only when such detachment does not involve the risk of accident, damage and/or injury.

A further object of the invention is to provide the connector with novel and improved means for preventing accidental disengagement of the coupling member from the eccentric and/or accidental disengagement of the connector from the profiled members.

SUMMARY OF THE INVENTION

The invention resides in the provision of a connector which can be used to separably couple a first profiled member having an internal space and an open end affording access to the internal space with a second profiled member having an internal compartment behind a wall which has an internal surface and an inlet affording access to the compartment. The improved connector comprises a housing which is receivable in the internal space of the first profiled member, a coupling member which is movable in the housing and includes at least one jaw or claw disposed outside of the housing and being insertable into the compartment of the second profiled member to engage the internal surface of the wall, and means for moving the coupling member relative to the housing. The moving means includes an eccentric which is rotatably mounted in the housing and is accessible at the exterior of the first profiled member when the housing is received in the internal space of the first profiled member. The coupling member further includes a first motion receiving projection which is adjacent the eccentric and is disposed between the eccentric and the at least one claw, a second motion receiving projection which is adjacent the eccentric opposite the first projection, and a looped end portion which is remote from the at least one claw. In accordance with a feature of the invention, the second projection is an integral part of the looped end portion of the coupling member.

The coupling member includes a plate-like portion, and the first projection as well as the looped end portion are preferably integral with the plate-like portion.

The looped end portion includes a first section extending away from the eccentric and being at least substantially coplanar and integral with the plate-like portion, a second section which overlaps the first section and extends toward the eccentric, and a bight between the first and second sections. The second projection is integral with the second section of the looped end portion. In accordance with one presently preferred embodiment, the second section of the substantially U-shaped looped end portion has a free end which constitutes the second projection. Alternatively, the looped end portion can constitute a closed loop wherein the second section is integral with a leg which constitutes or includes the second projection. The plate-like portion of the coupling member has an opening for a stub of the eccentric, and the leg of the closed loop-shaped end portion of the coupling member preferably extends through the opening substantially transversely of the plate-like portion. The leg can constitute a straight extension of the second section of the looped end portion and is preferably parallel or nearly parallel to the axis of rotation of the eccentric. The second section of the looped end portion is or can be at least substantially parallel with and can be closely adjacent the first section.

The first profiled member is preferably provided with a window for a front portion of the eccentric. The eccentric is axially movably installed in the housing of the connector so that its front portion can be depressed from the window into the housing in order to permit removal of the housing and coupling member (with the eccentric) from the internal space of the first profiled member. The coupling member comprises means (e.g., a leaf spring and the aforementioned plate-like portion of the coupling member) for biasing the front portion of the eccentric into the window of the first profiled member. The eccentric further comprises an eccentric disc which is disposed between the two projections and is preferably acted upon by the biasing means (particularly by the plate-like portion of the coupling member) to maintain the front portion of the eccentric in the window of the first profiled member. The arrangement is preferably such that the front side of the plate-like portion (namely the side facing the window in the first profiled member) abuts the disc under the bias of the leaf spring or of a separately produced spring which reacts against the housing and bears against the rear side of the plate-like portion.

The front portion of the eccentric can be depressed against the opposition of the biasing means; however, the arrangement is such that depression of the eccentric (to expel its front portion from the window) can take place only in a predetermined angular position of the eccentric. To this end, the connector comprises means for preventing depression of the eccentric when the latter is turned to leave its predetermined angular position. When it assumes the predetermined angular position, the eccentric maintains the coupling member in an extended position in which the claw or claws are ready for insertion into the internal compartment of the second profiled member. The coupling member is moved from the extended position to a retracted position (in which the claw or claws couple the second profiled member with the first profiled member) in response to turning of the eccentric (e.g., through an angle of 180 degrees) from the predetermined angular position. The aforementioned mentioned preventing means is operative to prevent depression of the eccentric into the housing at least when the coupling member assumes the retracted position but preferably as soon as the coupling member leaves its extended position, i.e., as soon as the eccentric leaves the predetermined angular position.

The preventing means can comprise a substantially radially extending first stop on the eccentric and a second stop which is provided in the housing (i.e., on the housing and/or on the coupling member) and is aligned with the first stop when the eccentric leaves the predetermined angular position, e.g., when the eccentric assumes a position at an angle of 180 degrees from the predetermined position. The second stop can form an integral part of the housing.

In addition to or in lieu of the aforediscussed stops, the preventing means can include the disc of the eccentric and a surface in a recess of the housing. The disc extends into the recess when the eccentric leaves its predetermined angular position. The preventing means can further comprise a radial projection on the stub of the eccentric. A rear wall member of the housing is then provided with an aperture which can receive the stub and its projection, or at least the projection of the stub, only when the eccentric is maintained in the predetermined angular position. This further reduces the likelihood of depression of front portion of the eccentric out of the window and into the housing (so that the housing can move in the internal space of the first profiled member) while the coupling member is held in retracted position and its claw or claws urge the second profiled member against the first profiled member. The configuration of the aperture in the rear wall member of the housing can be readily selected in such a way that the radial projection of the stub is permitted to enter the aperture (as a result of depression of the eccentric) only when the eccentric is maintained in the predetermined angular position.

The preventing means can further comprise one or more internal stops in the housing of the connector. Such stop or stops are overlapped by the coupling member (particularly by the looped end portion of the coupling member) when the latter is moved from the extended position (i.e., when the eccentric leaves its predetermined angular position) so that the stop or stops then prevent depression of the eccentric (because axial movements of the eccentric are shared by that portion, such as the looped end portion, of the coupling member which overlaps the internal stop or stops of the housing) as soon as the coupling member leaves its extended position or at least while the coupling member is maintained in the retracted position.

If the end portion of the coupling member forms a closed loop, the aforediscussed leg can form part of the preventing means and a portion (e.g., an internal rib- or web-shaped protuberance) of the rear wall member of the housing can form another part of the preventing means. The closed loop-shaped end portion of the coupling member shares the axial movements of the eccentric, and the end face of the leg is moved to a position of alignment with the protuberance of the rear wall member in response to movement of the coupling member from its extended position so that the protuberance then prevents depression of the eccentric because such depression would necessitate a movement of the leg in a direction away from the window but such movement is prevented by the rear wall member. The rear wall member is provided with a recess which permits entry of the leg in the extended position of the coupling member, i.e., the eccentric can be depressed when it assumes the predetermined angular position. The recess in the rear wall member can constitute an elongated slot having a width which only slightly exceeds the thickness of the leg so that the leg is out of alignment with the slot and prevents depression of the eccentric as soon as the coupling member leaves its extended position (e.g., as soon as the coupling member is shifted through a distance in the range of one or more tenths of one millimeter).

The front wall member of the housing can be provided with a recess or cutout for the looped end portion of the coupling member The connector is preferably designed in such a way that the looped end portion extends into the recess or cutout at least while the coupling member is maintained in the extended position. The front side of the front wall member of the housing is preferably flush with the front side of the looped end portion (particularly with the front side of the second section of the looped end portion, at least while the coupling member is out of the extended position. Thus, the looped end portion need not be received (or need not be fully received) in the housing but preferably does not extend beyond the front side of the front wall member of the housing irrespective of the position of the coupling member relative to the housing.

The novel features which are considered as characteristic of the invention are set forth in particular in the appended claims. The improved connector itself, however, both as to its construction and the mode of using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1A is a fragmentary sectional view of two profiled members and a front elevational view of a connector which embodies one form of the invention and is installed in one of the profiled members, the coupling member of the connector being shown in fully extended position and the sections through the profiled members being taken in the direction of arrows as seen from the line 1A—1A in FIG. 2A;

FIG. 1B is a fragmentary sectional view of the one profiled member and of the connector as seen in the direction of arrows from the line 1B—1B in FIG. 2B;

FIG. 2A is a fragmentary partly end elevational and partly sectional view as seen in the direction of arrows from the line 11A—11A in FIG. 1A;

FIG. 2B is a fragmentary sectional view of the one profiled member and of the connector substantially as seen in the direction of arrows from the line 11B—11B in FIG. 1A;

FIG. 2C is a fragmentary sectional view of the one profiled member and of the connector substantially as seen in the direction of arrows from the line 11C—11C in FIG. 1A;

FIG. 2D is an enlarged view of a detail in FIG. 2C;

FIG. 3 is a view similar to that of FIG. 2B but showing the eccentric in depressed position in which the connector can be removed from the one profiled member;

FIG. 4 is a view similar to that of FIG. 2A but showing the connector in operative position with the coupling member retracted to separably connect the one profiled member to the other profiled member;

FIG. 8 is a view similar to that of FIG. 1A but showing a modified connector with the coupling member in fully extended position, the section being taken in the direction of arrows as seen from the line VIII—VIII in FIG. 9;

FIG. 9 is a partly end elevational and partly sectional view substantially as seen in the direction of arrows from the line IX—IX in FIG. 8;

DESCRIPTION OF PREFERRED EMBODIMENTS

Figure 5:
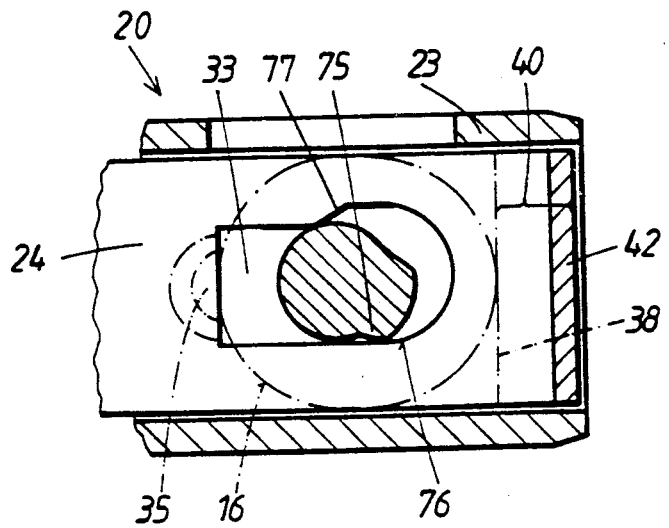
FIG. 5 shows the structure of FIG. 1B but with the eccentric in a different angular position corresponding to that of FIG. 4.

Referring first to FIGS. 1A to 4, the improved connector 20 serves to separably couple a first profiled member 10 with a second profiled member 11. The connector 20 has an elongated open-ended housing 23 which is removably installed in the internal space 12 of the profiled member 10. The latter has an open front end 13 to permit insertion of the housing 23 into and withdrawal or expulsion of the housing from the internal space 12. The housing 23 receives a profiled plate-like coupling member 24 having a front portion composed of two elongated resilient prongs 65, 65' with front end portions in the form of hook-shaped jaws or claws 22, 22' extending beyond the open front end 13 of the profiled member 10 through a maximum distance 27 when the member 10 is detached from the other profiled member 11 (FIGS. 1A and 2A) and through a lesser distance when the profiled members 10, 11 are separably coupled to each other (FIG. 4).

The profiled member 11 is an octagonal column which has eight walls 111 with internal surfaces 68 adjacent discrete elongated groove- or channel-shaped compartments 14. Each wall 111 has an elongated slot-shaped inlet 67 which affords access to the respective compartment 14. The claws 22, 22' are movable relative to each other between first (aligned) positions which are shown in FIGS. 2A, 2B, 2C and 3 (in which the claws are disposed one behind the other (as seen in FIG. 2A)

and their combined thickness is at least slightly less than the width of an inlet 67), and second (staggered) positions (shown in FIG. 4). The combined thickness of the claws 22, 22' in their second positions exceeds the width of an inlet 67 and the end faces 122, 122' of these claws then bear against the internal surface 68 of the adjacent wall 111 at opposite sides of the respective inlet 67 to urge the open front end 13 of the profiled member 10 against the outer side of the same wall 111, i.e., to clamp the selected wall 111 between the end faces 122, 122' and the front end 13.

The connector 20 comprises only three separable parts, namely the housing 23, the coupling member 24 and a rotary eccentric 25 which serves as a means for moving the coupling member relative to the housing between the aforediscussed extended and retracted positions. The front wall 110 of the profiled member 10 has a window 60 which normally receives a depressible front portion 15 of the eccentric 25. The front portion 15 is a cylindrical head which is adjacent a disc 16 of the eccentric 25. The disc 16 is disposed between the head 15 and a cylindrical stub 17 which is also an integral part of the eccentric 25 and is rotatably journalled in a rear wall member 30 of the housing 23.

The connector 20 comprises means for yieldably biasing the cylindrical head 15 of the eccentric 25 into the window 60 in the front wall 110 of the profiled member 10 in order to prevent accidental shifting of the housing 23 in the internal space 12. The biasing means of the connector 20 which is shown in FIGS. 1A to 4 comprises a leaf spring 26 which is an integral part of the coupling member 24 and bears against the rear wall member 30 of the housing 23. The biasing means further comprises a plate-like portion 31 of the coupling member 24; this plate-like portion 31 (hereinafter called plate for short) is integral with and is biased by the leaf spring 26 against the rear side of the disc 16. FIG. 2D shows that the front side 34 of the plate 31 bears against the rear side of the disc 16. In order to depress (arrow 62 in FIG. 3) the head 15 into the internal space 12 (i.e., to expel the head 15 from the window 60), it is necessary to overcome the resistance of the spring 26 and plate 31 of the coupling member 24 as well as to maintain the eccentric 25 in a predetermined angular position (FIGS. 1, 2A, 2B, 2C and 3) in which the prongs 65, 65' project beyond the open front end 13 of the profiled member 10 through the full distance 27. The claws 22, 22' are then aligned with each other and their end faces 122, 122' cannot engage the internal surface 68 of a wall 111. In other words, the head 15 of the eccentric 25 can be depressed into the internal space 12 only when the profiled members 10, 11 are separated or separable from each other; this reduces the likelihood of accidents or damage to the structure (e.g., a collapsible frame) including the profiled members 10, 11 because the connector 20 can be moved longitudinally of the internal space 12 only when the claws 22, 22' are not in staggered positions.

The depth of an aperture 53 which is provided in the rear wall member 30 of the housing 23 for the stub 17 of the eccentric 25 is sufficient to ensure that the stub does not project outwardly beyond the rear wall member 30 when the head 15 is expelled from the window 60.

The leaf spring 26 (which is an integral part of the profiled coupling member 24) can be replaced by, or used in conjunction with, a separately produced spring, for example, with a coil spring which surrounds the stub 17 to react against the rear wall member 30 of the housing 23 and to bear against the rear side of the disc 16.

The profiled plate-like coupling member 24 is preferably made of spring steel or an equivalent springy metallic material.

The prongs 65, 65' of the coupling member 24 are separated from each other by a longitudinally extending slot 57 (FIG. 1A) which has an enlarged portion in front and around the leaf spring 26. The prongs 65, 65' are but need not be mirror images of each other with reference to a plate which is normal to the axis of rotation of the eccentric 25 and includes the plate 31. The bifurcated rear end portion of the slot 57 extends all the way to the plate 31.

The claws 22, 22' are or can be mirror symmetrical to each other with reference to the aforementioned plane of the plate 31, not only in the positions of alignment (as shown, for example, in FIG. 2A) but also when they are staggered relative to each other in a manner as shown in FIG. 4. The hook-shaped portions (with end faces 122, 122') of the claws 22, 22' extend in opposite directions so that one of the end faces 122, 122' can engage a selected internal surface 68 at one side and the other end face can engage the same internal surface 68 at the other side of the respective inlet 67 in a manner as shown in FIG. 4. Such engagement is effected in response to rotation of the eccentric 25 from the (predetermined or starting) angular position of FIG. 1A to the angular position of FIG. 4, namely in response to longitudinal movement of the coupling member 24 in the direction of arrow 61 in FIG. 4. Such movement of the coupling member 24 automatically entails movements of the claws 22, 22' in directions which are respectively indicated by arrows 69 and 69' (FIG. 4), i.e., to staggered positions. This is due to the provision of followers 28, 28' on the prongs 65, 65, and cams 29, 29' on the housing 23. The followers 28, 28' are disposed immediately behind the respective claws 22, 22' and are integral parts of the respective prongs 65, 65'. Those surfaces of the followers 28, 28' which engage the cam faces of the respective cams 29, 29' cross each other (this can be seen in FIGS. 2A and 2B). The same applies for the cam faces of the cams 29, 29' which are integral portions of the main section of the housing 23. As can be seen in FIG. 4, the foremost portions or tips of the cams 29, 29' extend into the selected inlet 67 when the profiled members 10, 11 are coupled to each other; this relieves the claws 22, 22' of the task of centering or orienting the profiled members 10, 11 relative to each other. The tips of the cams 29, 29' are assisted by extensions 21 which are integral parts of the housing 23 and extend into the selected inlet 67 when the profiled members 10, 11 are coupled to each other. The extensions 21 flank the claws 22, 22' and are coplanar and aligned with these claws when the eccentric 25 is maintained in the predetermined starting angular position of FIG. 1A, i.e., when the claws 22, 22' are located exactly one behind the other and the combined thickness of the claws (as measured at right angles to the plane of the plate 31) does not exceed the thickness of a single claw.

The prongs 65, 65' are substantially S-shaped and cross each other in the regions of their followers 28, 28'. The leaf spring 26 can be said to constitute a relatively short third prong or tongue of the coupling member 24 and extends longitudinally of the prongs 65, 65' in a direction from the plate 31 toward the claws 22 and 22'.

The exposed front surface of the cylindrical head 15 of the eccentric 25 is accessible through the window 60 in the front wall 110 of the profiled member 10 and is provided with a centrally located recess 19 for the working end of a suitable tool (not shown) which can be used to rotate the eccentric to and from the predetermined angular position of FIG. 1. The tool can be a hand tool (e.g., a simple socket wrench or a simple screwdriver) or a power tool. The front surface of the head 15 is further provided with an index or marker 18 in the form of an elongated notch which indicates the angular position of the disc 16. The marker 18 extends toward the claws 22, 22' when the eccentric 25 is maintained in the predetermined or starting angular position of FIG. 1A in which the head 15 can be depressed in the direction of arrow 62 preparatory to removal or expulsion of the connector 20 from the internal space 12 of the profiled member 10.

The plate 31 carries two projections 35, 38 which flank the disc 16 of the eccentric 25. The projection 35 is a depressed portion of the plate 31 adjacent an opening 33 for the shank 17 and is located between the disc 16 and the claws 22, 22'. The other projection 38 is located behind the disc 16 substantially diametrically opposite the projection 35 and is an integral part of a looped rear end portion 40 of the coupling member 24. When the eccentric 25 is maintained in the predetermined angular portion of FIG. 1, the maximum-eccentricity portion of the disc 16 is adjacent the projection 35. If the eccentric 25 is turned to change its angular position, the disc 16 acts upon the projection 38 and moves the coupling member 24 relative to the housing 23 in the direction of arrow 61, i.e., the claws 22, 22' are caused to move toward the open front end 13 of the profiled member 10 (it is assumed here that the connector 20 is installed in the internal space 12 and that the head 15 of the eccentric 25 extends into the window 60 in the wall 110 of the profiled member 10). The eccentric 25 is turned to leave its predetermined angular position subsequent to introduction of the (then aligned) claws 22, 22' into a selected compartment 14 so that the front end 13 of the profiled member 10 abuts the outer side of the adjacent wall 111. As the eccentric 25 turns and the projection 38 pulls the claws 22, 22' toward the internal surface 68 of the adjacent wall 111, the followers 28, 28' slide along the respective cams 29, 29' to stagger the claws whereby the end faces 122, 122' of the claws engage the internal surface 68 at opposite sides of the respective inlet 67 and urge the outer side of the wall 111 against the front end 13 of the profiled member 10 to separably couple the members 10, 11 to each other.

The coupling operation is (or can be) completed when the eccentric 25 is turned through 180 degrees so that the maximum-eccentricity portion of the disc 16 abuts the projection 38 of the looped rear end portion 40 of the profiled coupling member 24.

The rear end portion 40 of the coupling member 24 includes a first section 46 which is coplanar with and constitutes an integral rearward extension of the plate 31, a second section 43 which is parallel with and adjacent the section 46, and an arcuate bight 42 which connects the rear ends of the sections 43, 46. The rear projection 38 is an integral part of the section 43 which is located at the front side 34 of the plate 31.

The coupling member 24 is first assembled with the eccentric 25 (the stub 17 of the eccentric 25 is inserted through the opening 33 of the plate 31 in a direction from the front side 34 of the plate) until the rear side of the disc 16 abuts the front side 34 of the plate 31 and the disc is located between the projections 35, 38. The assembling step is preferably carried out in such a way that the marker 18 extends from the recess 19 toward the claws 22, 22', i.e., the eccentric 25 is maintained in the starting or predetermined angular position with reference to the coupling member 24. The latter is then inserted into the housing 23 through the open rear end 51 so that the head 15 enters a semicircular recess 50 in the front wall member 36 of the housing. The recess 50 has a wider rear end 52 for the looped end portion 40 of the coupling member 24. The eccentric 25 is thereupon moved axially and rearwardly (arrow 62) to introduce a portion of the stub 17 into the aperture 53 in the rear wall member 30 of the housing 23 or to move the stub 17 deeper into the aperture 53. The connector 20 is then fully assembled and can be introduced into the internal space 12 through the open front end 13 of the profiled member 10. The depressed head 15 snaps (arrow 32) into the window 60 of the front wall 110 under the bias of the leaf spring 26 and plate 31 as soon as the eccentric 25 reaches a position of alignment with the window. This fixes the connector 20 in an optimum position with reference to the profiled member 10, i.e., the connector is ready to be manipulated for the purpose of coupling the profiled member 10 to the profiled member 11.

In order to simplify proper initial orientation of the eccentric 25 relative to the housing 23 during introduction of the coupling member 24 through the open rear end 51 of the housing, the rear end face of the stub 17 is preferably provided with a diametrically extending notch or channel 58 (FIG. 10) which can receive an internal rib- or web-shaped protuberance 59 of the rear wall member 30 forming part of the housing 23. When the inserting step is completed, the housing 23 and the coupling member 24 assume the positions which are shown in FIG. 2D; the rear portion of the stub 17 then extends into or is aligned with the aperture 53 in the rear wall member 30 of the housing 23, and the head 15 of the eccentric 25 is maintained in the window 60. The front side 34 of the plate 31 bears against the rear side of the disc 16 (which is flanked by the projections 35, 38) so that the head 15 continues to extend into the window 60 until it is depressed in the direction of arrow 62. However, and as already mentioned above, depression of the head 15 into the internal space 12 (i.e., into the housing 23) can take place only when the eccentric 25 assumes the predetermined starting angular position of FIG. 1A, i.e., when the index or marker 18 (which is aligned with the channel or notch 58 in the rear end face of the stub 17) extends toward the claws 22 and 22'. This ensures that the maximum-eccentricity portion of the disc 16 is then adjacent the front projection 35 which is an integral part of the plate 31 behind the slot 57. The rear end faces of the extensions 21 of the housing 23 abut the front end 13 when the connector 20 is properly inserted into the internal space 12 of the profiled member 10. This indicates to the person or persons handling the connector 20 that the head 15 of the eccentric 25 is aligned with the window 60 in the front wall 110.

The surfaces of the followers 28, 28' need not constitute simple two-dimensional (flat or plane) ramps. For example, such surfaces can be replaced with three-dimensional helical surfaces which slide along complementary cams on the housing to impart to the claws a torsional or twisting movement, i.e., the staggering involves angular movements of the claws about an axis extending longitudinally and substantially centrally of the coupling member. The end faces of the claws then extend across the respective inlet 67 (i.e., each of the two end faces engages the selected internal surface 68 at both sides of the respective inlet 67) when the step of coupling the profiled members 10, 11 to each other is completed. All that counts is to ensure that the claws are aligned with the extensions 21 during introduction into or during extraction from a selected compartment 14, and that the claws are staggered relative to each other and relative to the extensions 21 in response to turning of the eccentric 25 from the predetermined angular position of FIG. 1A.

It is also possible to replace the illustrated simple cams 29, 29' with cams which are located in a guide slot of the housing 23. This would result in the provision of a pair of cam faces for each of the two followers 28, 28', i.e., each of these followers can be disposed between two cam faces.

An important advantage of the connector 20 is that its rather simple rear projection 38 can stand pronounced stresses without risking breakage, cracking, chipping and/or excessive flexing in actual use, i.e., while the coupling member 24 is being moved toward and while the coupling member dwells in the retracted position in which the claws 22, 22' bear against the internal surface 68 of a selected wall 111. This is due to the provision of the looped rear end portion 40 with its parallel sections 43, 46. The likelihood of deformation of the end portion 40 in response to exertion of a pressure against the front end face (projection 38) of the section 43 is very remote and certainly much more remote than the likelihood of flexing one leg of a substantially L-shaped rear end portion. Flexing of the originally flat rear part of the coupling member 24 through an angle of substantially 180 degrees (in order to form the bight 42 and the section 43 which latter is substantially parallel with and is located in front of the section 46) is a simple and time-saving procedure which can be carried out in available machines. The forces which the disc 16 of the eccentric 25 transmits to the projection 38 act in the longitudinal direction of the folded-over section 43 of the rear end portion 40 and can greatly exceed the forces which can be taken up by an L-shaped rear end portion wherein the eccentric acts upon one leg and the other leg is integral with the major part of the connector. Otherwise stated, the resistance which the section 43 could offer to deformation in response to stressing by the disc 16 would be much smaller if the section 43 were to extend at right angles to the section 46. The disc 16 does not and cannot subject the section 43 to bending stresses because it acts against the front end face (38) of the section 43 and tends to move this section rearwardly with respect to the adjacent parallel section 46 which is integral with the plate 31. The bight 42 of the rear end portion 40 is capable of withstanding large forces which tend to move the section 43 in its plane, namely in parallelism with the common plane of the section 46 and plate 31.

FIG. 5 shows means for preventing rotation of the eccentric 25 through more than 180 degrees beyond the predetermined starting angular position. A radially extending projection 75 of the stub 17 is turnable in the opening 33 of the plate 31 and engages an internal surface 76 bounding a portion of the opening 33 when the eccentric 25 has completed an angular movement through approximately 180 degrees from the starting position. The marker 18 then extends rearwardly toward the projection 38 and the operator senses that the eccentric 25 has reached that end position in which the claws 22, 22' are located at a minimum distance from the housing 23 and that, therefore, their end faces 122, 122' bear against the adjacent internal surface 68 in the selected compartment 14. The configuration of the surface 76 is such that the eccentric 25 must be turned in a clockwise direction in order to move the projection 75 into abutment with the surface 76 and that the eccentric must be turned in a counterclockwise direction in order to return to the starting angular position of FIG. 1A. The projection 75 then assumes the angular position which is shown in FIG. 1B and is located in a laterally extending portion 77 of the opening 33.

Figure 6:
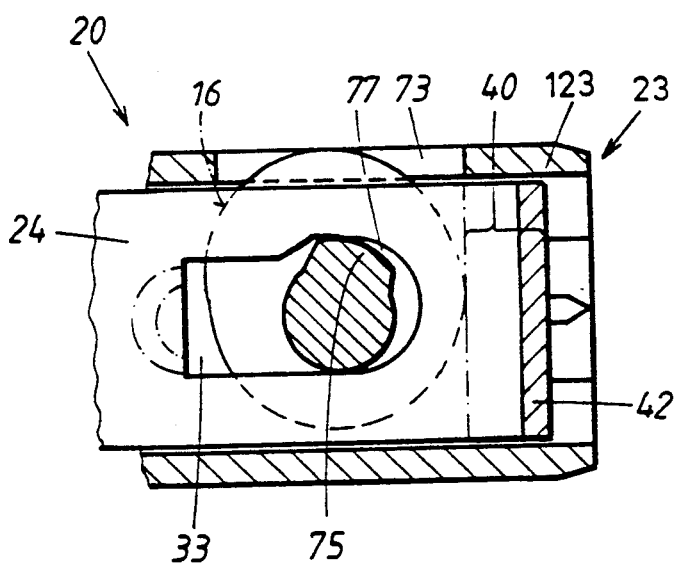
FIG. 6 is a view similar to that of FIG. 1B or 5 but showing the eccentric in an intermediate angular position in which a portion of a disc forming part of the eccentric extends into a slot in the housing of the connector.
Figure 7:
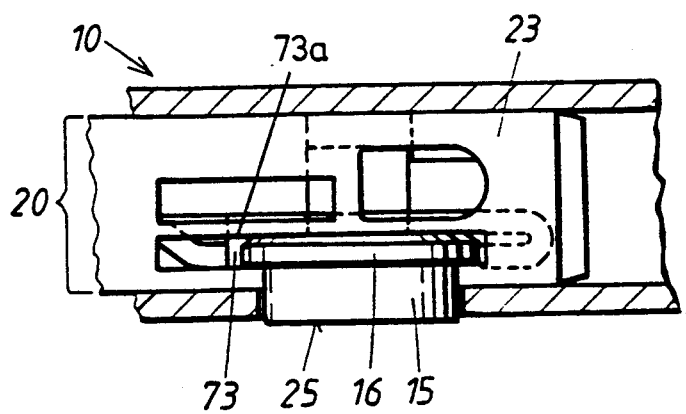
FIG. 7 shows a portion of the structure of FIG. 2A with the eccentric in the angular position of FIG. 6.

One embodiment of the means for preventing depression of the head 15 of the eccentric 25 from the window 60 and into the internal space 12 of the profiled member 10 is shown in FIGS. 6 and 7. A side wall member 123 of the housing 23 has a recess 73 (e.g., in the form of an elongated slot extending at right angles to the axis of rotation of the eccentric) which receives a portion of the disc 16 when the maximum-eccentricity portion of the disc is moved away from the front projection 35 of the coupling member 24. The disc 16 can begin to penetrate into the recess 73 in the wall member 123 shortly after the coupling member 24 leaves the fully extended position of FIG. 1A or 2A. The surfaces bounding the recess 73 not only prevent depression of the head 15 out of the window 60 but also ensure that the disc 16 remains in the space between the front and rear projections 35, 38. Moreover, one of the surfaces bounding the recess 73 (namely the upper surface 73a as seen in FIG. 7) can be said to constitute a stop for the disc or stop 16. Thus, a person who is not familiar with the construction of the connector 20 and is in the process of turning the eccentric 25 is likely to exert against the head 15 a pronounced axially orientated force (arrow 62) while the working end of a tool extends into the recess 19. This could result in damage to the connector 20. The rear side of the disc 16 bears against the surface or stop 73a in the recess 73 and thus holds the entire eccentric 25 in an optimum axial position while the eccentric moves the coupling member 24 relative to the housing 23.

FIGS. 1A, 2B, 2C, 2D, 3 and 4 show that the housing 23 is formed with at least one internal abutment or stop 74 which is located behind the looped end portion 40 in fully extended position of the coupling member 24 (FIG. 3). However, if the eccentric 25 is turned from the starting angular position which is shown in FIG. 1A, the rounded external surface of the bight 42 of the looped end portion 40 slides along and in front of the stop or stops 74 so that the front end face of each such stop then abuts the rear side of the section 46 and prevents depression of the head 15 out of the window 60 and into the internal space 12 of the profiled member 10. Thus, the stop or stops 74 are effective to prevent depression of the head 15 as soon as the eccentric 25 leaves, and as long as the eccentric remains out of, the starting angular position. The stop or stops 74 assist the surface or stop 73a in the recess 73 and vice versa.

FIGS. 8 to 13 show a modified connector 20' which can be used in lieu of the connector 20. The coupling member 24' in the housing 23' of the connector 20' has a single prong 65 the front end portion of which is substantially U-shaped to constitute a single jaw or claw 22. When in the fully extended position (see FIG. 9), the prong 65 and its claw 22 extend beyond the open front end 13 of the profiled member 10 through a distance 27. The single claw 22 is flanked by two extensions 21 of the housing 23' and the rear end faces of these extensions abut the front end 13 of the profiled member 10 when the housing 23' is fully inserted into the internal space 12 so that the head 15 of the eccentric 25 is free to enter the window 60 in the front wall 110. When the claw 22 is received in a selected compartment 14 of the profiled member 11 (FIG. 13) and the eccentric 25 is turned to leave its starting or predetermined angular position (FIGS. 8 and 9) and to move toward the position at an angle of 180 degrees from the starting position (FIG. 13), the follower 28 of the prong 65 which carries the single claw 22 slides along the cam 29 of the housing 23' and moves the end face 122 of the claw 22 sideways so that the end face 122 ultimately engages the internal surface 68 in the selected compartment 14 at one side of the respective inlet 67. The housing 23 or 23' can be made of zinc die casting material.

The leaf spring 26 of the coupling member 24' is integral with the prong 65 and extends rearwardly toward the eccentric 25 to bear against the adjacent front part of the rear wall member 30 of the housing 23'. This leaf spring is formed by providing the single prong 65 with a U-shaped slit and by bending the prong portion within the slit outwardly toward the rear wall member 30 of the housing 23'. The purpose of the leaf spring 26 is to urge the front side 34 of the plate-like portion or plate 31 of the coupling member 24' against the rear side of the disc 16, i.e., in the direction of arrow 32.

The opening 33 in the plate 31 of the coupling member 24' is an elongated slot which receives a portion of the stub 17.

The plate 31 is integral with the front projection 35, and a modified looped rear end portion 40' of the coupling member 24' is provided with a second or rear projection 38' which replaces the projection 38 on the section 43 of the simpler looped end portion 40 forming part of the aforedescribed coupling member 24. The projections 35, 38' are adjacent the front wall member 36 of the housing 23' at the front side 34 of the plate 31. The front projection 35 constitutes a forwardly shifted portion of the plate 31 adjacent the front end of the opening 33.

Figure 12:
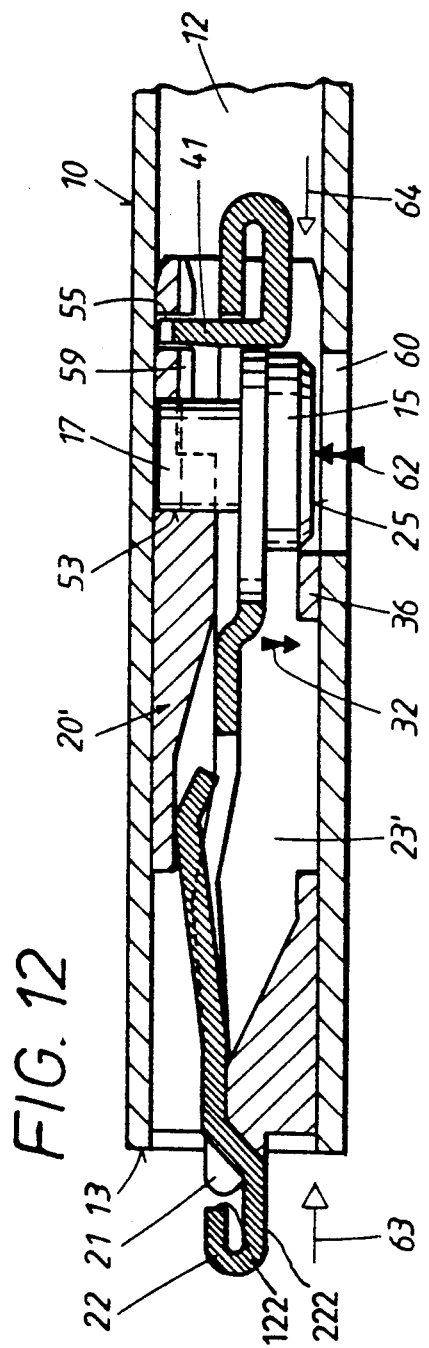
FIG. 12 is a sectional view of the one profiled member and of the modified connector, with the eccentric shown in depressed position so that the modified connector can be removed from the one profiled member.

The head 15 of the eccentric 25 is received in the semicircular recess 50 in the front wall member 36 of the housing 23'. The rear portion of the recess 50 is widened, as at 52, and extends all the way to the open rear end 51 of the housing 23' to receive the looped rear end portion 40' (see particularly FIG. 8). The axis of rotation 44 (FIGS. 9 and 13) of the eccentric 25 is normal to the plane of the plate 31 and is substantially or exactly parallel with an elongated straight section or leg 41 forming an integral part of the section 43 of the looped rear end portion 40' and including or constituting the rear projection 38' for the disc 16 of the eccentric 25. The disc 16 normally abuts the inner or rear side of the front wall member 36; however, it can be moved rearwardly to permit depression of the entire head 15 into the housing 23' when the eccentric 25 is depressed in the direction of arrow 62 while it assumes the starting angular position of FIG. 8 or 9. The stub 17 is a cylinder which is aligned with the aperture 53 in the rear wall member 30 of the housing 23' and enters the aperture 53 at least when the head 15 is depressed in the direction of arrow 62. FIG. 12 shows that the stub 17 does not extend beyond the outer side of the rear wall member 30 when the head 15 is fully expelled from the window 60 in the front wall 110 of the profiled member 10.

When the eccentric 25 is properly assembled with the housing 23' and with the coupling member 24', one-half of the periphery of the stub 17 is received in a semicircular extension 54 of the aperture 53 (FIG. 10), namely that half which faces toward the claw 22. The extension 54 of the aperture 53 extends toward the front wall member 36 and is defined by a thicker portion 39 (FIGS. 10 and 11) of the rear wall member 30 in front of the stub 17. The thicker portion 39 can be said to resemble a platform with the extension 54 provided in its rear face.

The rear portion of the periphery of the stub 17 is adjacent the front end face of a longitudinally extending web- or rib-shaped protuberance 59 which extends all the way to the open rear end 51 of the housing 23' and is provided at the front side and centrally of the rear wall member 30. The end face of the stub 17 is formed with the aforementioned channel or notch 58 which extends diametrically of the eccentric 25 and receives the protuberance 59 during introduction of the eccentric into the housing 23' by way of the open rear end 51. As already explained in connection with the embodiment of FIGS. 1A to 4, the protuberance 59 cooperates with the surface bounding the channel 58 to ensure that the eccentric 25 must assume one of two predetermined angular positions in order to enable its stub 17 to advance along the protuberance 59 toward a position of alignment with the aperture 53.

Figure 10:
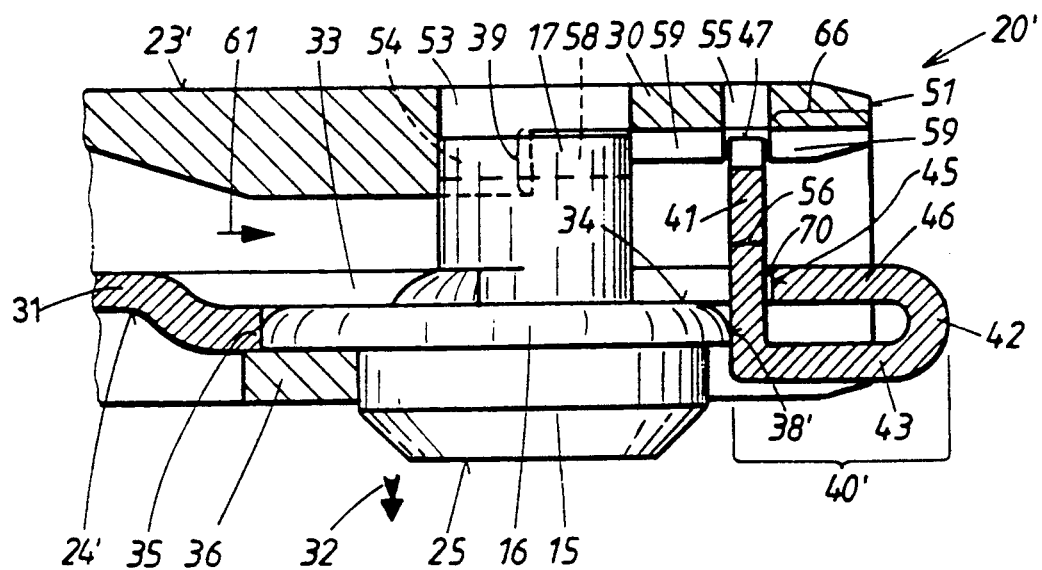
FIG. 10 is an enlarged view of a detail in FIG. 9, with the profiled members omitted.

As can be seen in FIG. 10, the end portion 40' is a complete or closed loop and the leg 41 of the section 43 extends into, through and beyond the opening 33 in a direction from the front side 34 of the plate 31 toward the rear wall member 30 of the housing 23'. When the front side 34 of the plate 31 bears against the rear side of the disc 16 and the front side of the disc bears against the inner side of the front wall member 36, the end face 47 of the leg 41 is closely adjacent the inner side of the rear wall member 30. The end face 47 has a channel or notch 49 (FIG. 11) which receives the protuberance 59 during insertion of the coupling member 24' and eccentric 25 into the housing 23' by way of the open rear end 51.

The width 48 (FIG. 11) of the leg 41 is less than the width of the sections 43, 46 and bight 42, and such width 48 is slightly less than the length of a recess in the form of a slot 55 which is provided in the rear wall member 30 and can receive a portion of the leg 41 only when the eccentric 25 is maintained in the starting angular position of FIG. 9. The thickness 56 (FIG. 10) of the leg 41 is only slightly less than the width of the slot 55. Thus, if the coupling member 24' is caused to leave its fully extended position (e.g., through a distance of 0.1 mm or another fraction of one millimeter), the recess or notch 49 in the end face 47 of the leg 41 receives a portion of the protuberance 59 and prevents depression of the eccentric 25 in the direction of arrow 62.

Figure 11:
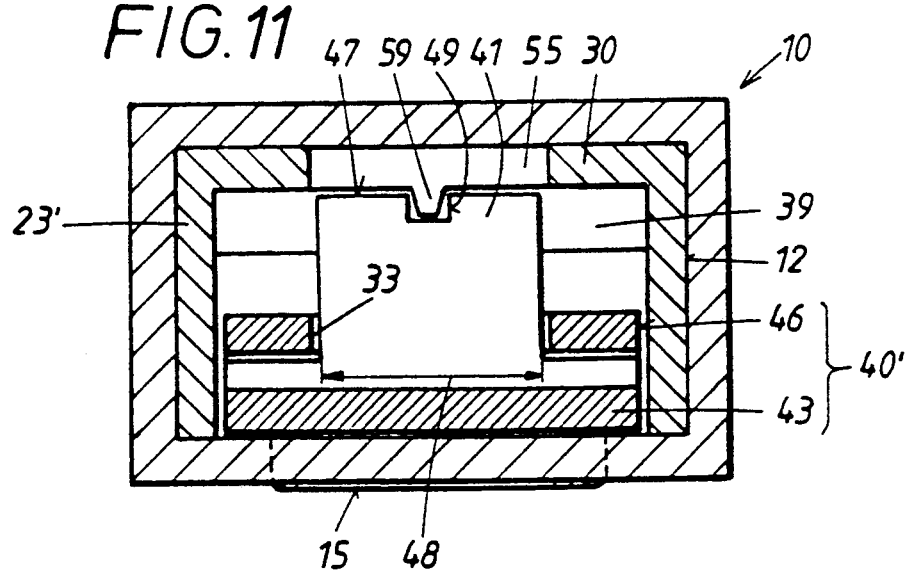
FIG. 11 is an enlarged transverse sectional view as seen in the direction of arrows from the line XI—XI of FIG. 9.

FIG. 11 shows that the width 48 of the leg 41 is only slightly less then the width of the corresponding portion of the opening 33 in the plate 31. It is normally preferred to design the looped end portion 40' in such a way that the internal surface 45 surrounding the rear portion of the opening 33 and the rear side of the leg 41 define a rather narrow clearance or gap 70 (FIG. 10) so that the leg 41 must be flexed (arrow 71 in FIG. 13) before its rear side actually engages the internal surface 45. Thus, the leg 41 acts not unlike a lever which is pivotable at the front end of the section 43 in response to movement of the maximum-eccentricity portion of the disc 16 toward engagement with the projection 38' (i.e., toward engagement with the front side of the leg 41).

The manner of assembling the three component parts 23', 24' 25 of the connector 20' is analogous to the aforedescribed manner of assembling the parts of the connector 20 of FIGS. 1A to 4. Thus, a first step includes insertion of the stub 17 into the opening 33 from the front side 34 of the plate 31, and the parts 24', 25 are then introduced into the housing 23' through the open rear end 51. The head 15 of the eccentric 25 can be depressed into the housing 23' (arrow 62) when the stub 17 is aligned with the aperture 53, and the connector 20' is then ready for insertion (arrow 63 in FIG. 12) into the internal space 12 by way of the open front end 13 of the profiled member 10 until the front end 13 is engaged by the rear end faces of extensions 21 on the housing 23'. This ensures that the head 15 is in line with the window 60 and that the biasing means 26, 31 are free to move the eccentric axially (arrow 32) in order to introduce a portion of the head 15 into the window.

Full depression of the head 15 into the front wall member 36 of the housing 23' is possible when the stub 17 is properly aligned with the aperture 53 and the leg 41 of the looped end portion 40' is in accurate register with the slot 55 in the rear wall member 30 of the housing 23'.

In order to remove the connector 20' from the internal space 12 of the profiled member 10, the operator moves the eccentric 25 to the starting angular position of FIGS. 8 and 9 and depresses the head 15 in the direction of arrow 62, i.e., out of the window 60 and into the housing 23' The housing 23' is then ready to leave the internal space 12 in the direction of arrow 64 (FIG. 12).

Figure 13:
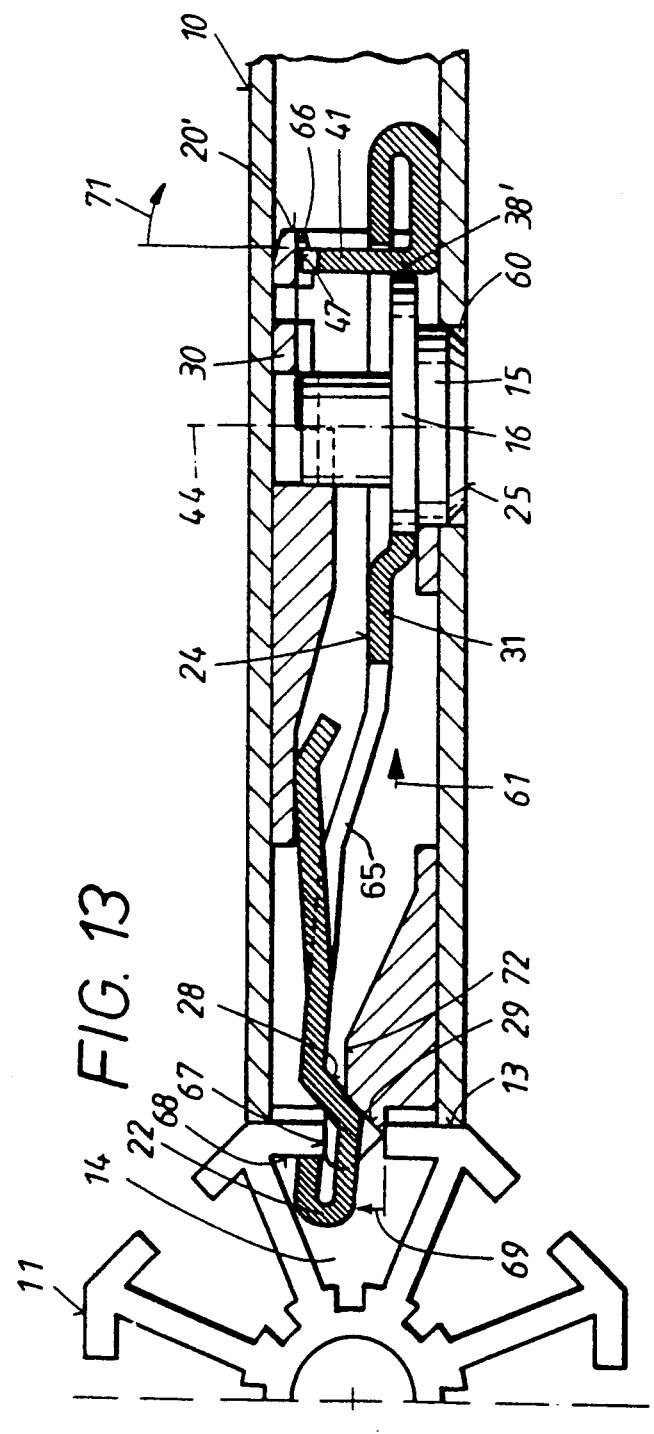
FIG. 13 illustrates the structure of FIG. 9 but with the coupling member of the modified connector in retracted position in which the two profiled members are separably coupled to each other and the eccentric cannot be depressed into the housing of the modified connector.

FIG. 13 shows that the cam 29 of the housing 23' has a rearwardly extending platform-like portion 72 which is engaged by the single prong 65 of the coupling member 24' immediately behind the follower 28 in the extended position of the coupling member. The prong 65 is biased against the platform 72 by the spring 26 which bears against the inner side of the rear wall member 30 of the housing 23'. This ensures that the claw 22 is normally maintained in a predetermined position as considered in the axial direction of the eccentric 25, i.e., at right angles to the plane of the plate 31. The exposed surface of the platform 72 can be slightly convex or flat. It is also possible to design the cam 29 in such a way that it abuts the front side 222 of the claw 22 when the latter engages a wall 111 (FIG. 13) so that the cam 29 then prevents disengagement of the end face 122 from the internal surface 68 of the wall 111 except in response to rotation of the eccentric 25 back to the starting angular position, i.e., in response to movement of the coupling member 24' toward its extended position so that the front side 222 of the claw 22 slides off the platform of the cam 29.

The reference character 66 denotes in FIGS. 10 and 13 that portion of the protuberance 59 which extends from the slot 55 to the open rear end 51 of the housing 23'. As already described hereinbefore, the leg 41 of the looped end portion 40' moves to the right and out of full alignment with the slot 55 when the eccentric 25 is turned to leave the starting angular position of FIGS. 8 and 9. This causes the portion 66 of the protuberance 59 to penetrate into the notch 49 in the end face 47 of the leg 41 so that the protuberance 59 then prevents depression of the head 15 in the direction of arrow 62, i.e., the head 15 continues to extend into the window 60 and can leave the window only when the eccentric 25 is caused to reassume the starting angular position. FIG. 13 shows that, when the coupling member 24' is moved to the fully retracted position, the entire leg 41 is out of alignment with the slot 55, i.e., the portion 66 of the protuberance 59 extends through the entire notch 49 and forwardly beyond the front side of the leg 41 to even reliably prevent depression of the head 15 out of the window 60 and into the housing 23'.

FIGS. 8 to 10 and 12-13 show that the looped end portion 40' can extend rearwardly beyond the open rear end 51 of the housing 23' not only in the retracted but also in the extended position of the coupling member 24'. In fact, when the protuberance 59 cooperates with the leg 41 to prevent depression of the eccentric 25 in the direction of arrow 62, the front side of the section 43 of the looped end portion 40' can be flush with the front side of the front wall member 36 of the housing 23'.

The leg 41 can yield (i.e., it can be pivoted by the disc 16 in the direction of arrow 71) in response to turning of the eccentric 25 from its starting position. However, it is not always necessary that the leg 41 actually abut the internal surface 45 of the plate 31 (in the opening 33) when the eccentric 25 reaches the angular position of FIG. 13, i.e., when the coupling member 24' assumes the fully retracted position. The stress which develops as a result of clamping of a selected wall 111 between the end face 122 of the claw 22 and the front end face 13 of the profiled member 10 is then transmitted from the claw 22, through the remaining portion of the single prong 65 and disc 16 on to the slightly pivoted leg 41. The resilient leg 41 stores energy and urges the end face 122 of the claw 22 against the internal surface 68 of the adjacent wall 111. The flexible and pivotable leg 41 can compensate for certain manufacturing tolerances to an extent which is determined by the width of the clearance 70. In addition, the flexible and pivotable leg 41 reduces the likelihood of damage to the profiled member 10 which is often made of a relatively soft material, such as aluminum or an aluminum alloy. If the stresses upon the coupling member 24' are increased beyond expectations, the leg 41 is pivoted all the way into actual abutment with the internal surface 45 (i.e., the width of the clearance 70 is reduced to zero) to greatly enhance the ability of the projection 38' to resist stresses which are transmitted by the disc 16. The leg 41 then directly abuts the rear section 46 of the looped rear end portion 40' to offer a greatly increased resistance to separation of the end face 122 of the claw 22 from the adjacent wall 111.

The aforediscussed means (47, 59) for preventing depression of the eccentric 25 in the direction of arrow 62 except when the eccentric is maintained in the starting angular position of FIGS. 8 and 9 can be utilized alone or in combination with additional depression preventing means. For example, the eccentric 25 can be provided with one or more radially extending projections which engage complementary stops or abutments of the coupling member 24 or 24' and/or housing 23 or 23' in each but one angular position of the eccentric. Tne opening 33 in the plate 31 can be configurated in such a way that it permits the stub 17 to move axially into or deeper into the aperture 53 only when the eccentric 25 is returned to its starting angular position.

It is further possible to modify the connector 20 and/or 20' in additional ways without departing from the spirit of the invention. For example, the sections 43, 46 of the looped end portion 40 or 40' need not be exactly or even approximately parallel to each other. This would enable the section 43 to pivot relative to the section 46 at the bight 42 to yield in response to certain stresses in a direction to reduce the angle between the sections 43 and 46.

It is also possible to change the configuration of the claws 22, 22' of the coupling member 24 and/or of the single claw 22 of the coupling member 24'. For example, the claws need not resemble U-shaped bodies but can resemble hammer heads.

An advantage of the connector 20' is that the closed loop-shaped rear end portion 40' of its coupling member 24' is even less likely to yield in response to stressing of the projection 38' by the disc 16 than the end portion 40 of the coupling member 24. All this is achieved by the simple expedient of folding a longer part (41+43) relative to the section 46 and of thereupon folding the leg 41 relative to the section 43 so that the leg 41 extends through the opening 33 and its rear side is adjacent (but need not actually touch) the internal surface 45 of the plate 31. All that is necessary is to properly shape the respective part of a plate-like blank which is converted into the coupling member 24'. This involves proper selection of the width 48 of the leg 41 so that the leg can pass through the rear portion of the opening 33.

Another advantage of the connector 20' and of its coupling member 24' is that the rear end portion 40' can compensate for manufacturing and other tolerances by the simple expedient of establishing a clearance 70 between the leg 41 and the internal surface 45 in the rear portion of the opening 33. This enables the pivotable resilient leg 41 to change its angular position relative to the section 43 and to thus compensate for eventual machining or other tolerances. In addition, once the leg 41 is flexed all the way into abutment with the internal surface 45, it can offer a very high resistance to stresses which are transmitted by the disc 16 while the eccentric 25 is caused to turn away from its starting angular position and while the connector 20' is in actual use to couple the profiled members 10 and 11 to each other. Though the closed loop-shaped end portion 40' contains more material than the substantially U-shaped end portion 40 of the coupling member 24, the additional outlay for material is warranted in many instances due to greater versatility of the rear end portion 40' and its projection 38'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A connector for separably coupling a first profiled member having an internal space and an open end affording access to the internal space with a second profiled member having an internal compartment behind a wall which has an internal surface and an inlet affording access to the compartment, comprising a housing receivable in the internal space of the first profiled member; a coupling member movable in said housing and including at least one claw disposed outside of said housing and being insertable into the compartment of he second profiled member to engage the internal surface of the wall; and means for moving said coupling member relative to said housing, including an eccentric rotatably mounted in said housing and being accessible at the exterior of the first profiled member when said housing is received in the internal space of the first profiled member, said coupling member further including a first motion receiving projection adjacent said eccentric and disposed between said eccentric and said at least one claw, a second motion receiving projection adjacent said eccentric opposite said first projection, and an end portion remote from said at least one claw, said second projection being an integral part of said end portion and said end portion having overlapping first and second sections.

2. The connector of claim 1, wherein said coupling member includes a plate-like portion and said first projection and said end portion are integral with said plate-like portion.

3. The connector of claim 1, wherein said first section extends away from said eccentric and said second section extends toward said eccentric, said end portion further having a bight between said sections.

4. The connector of claim 3, wherein said second projection is integral with said second section.

5. The connector of claim 4, wherein said second section has a free end which constitutes said second projection.

6. The connector of claim 1, wherein said end portion is a closed loop.

7. The connector of claim 6, wherein said closed loop includes a leg which constitutes said second projection.

8. The connector of claim 7, wherein said coupling member includes a plate-like portion having an opening, said leg extending through said opening substantially transversely of said plate-like portion.

9. The connector of claim 8, wherein said eccentric includes a portion extending through said opening, said leg being substantially parallel to the axis of rotation of said eccentric.

10. The connector of claim 1, wherein said coupling member includes a plate-like portion having an opening for a portion of said eccentric, said first section being integral and substantially coplanar with said plate-like portion and said second section being substantially parallel to said first section, said end portion further having a bight between said sections and said second projection forming part of said second section.

11. The connector of claim 1 for separably coupling a first profiled member having a window, wherein said eccentric is axially movably mounted in said housing and includes a portion which is receivable in the window when said housing is installed in the internal space of the first profiled member, and further comprising means for biasing said eccentric axially to maintain said portion of the eccentric in the window of the first profiled member.

12. The connector of claim 11, wherein said eccentric comprises a disc between said projections and said biasing means is arranged to bear against said disc.

13. The connector of claim 12, wherein said biasing means includes a plate-like portion of said coupling member, said plate-like portion having a side abutting said disc and said first section being substantially coplanar and integral with said plate-like portion, said end portion further having a bight connecting said sections.

14. The connector of claim 13, wherein said biasing means further comprises a spring which is integral with said plate-like portion and bears against said housing to urge said side of said plate-like portion against said disc.

15. The connector of claim 11, wherein said portion of said eccentric is depressible from the window into said housing against the opposition of said biasing means in a predetermined angular position of said eccentric, and further comprising means for preventing depression of said portion of said eccentric when said eccentric is rotated to an angular position other than said predetermined position.

16. The connector of claim 15, wherein said coupling member is movable between an extended position corresponding to the predetermined angular position of said eccentric and a retracted position in which said preventing means is operative to prevent depression of said portion of said eccentric into said housing.

17. The connector of claim 15, wherein said preventing means comprises a substantially radially extending first stop on said eccentric and a second stop provided in said housing and being aligned with said first stop in said other angular position of said eccentric.

18. The connector of claim 17, wherein said second stop is an integral part of said housing.

19. The connector of claim 15, wherein said eccentric comprises a disc between said projections and said preventing means has a recess in said housing, said disc extending into said recess in said other angular position of said eccentric.

20. The connector of claim 19, wherein said eccentric comprises a stub which is rotatably journalled in said housing and a disc between said stub and said depressible portion, said housing having an aperture for said stub and said stub being depressible into said aperture only in said predetermined angular position of said eccentric.

21. The connector of claim 20, wherein said stub has a radial projection and said aperture is configurated to permit entry of said radial projection only in said predetermined angular position of said eccentric.

22. The connector of claim 15, wherein said eccentric further comprises a stub and said housing includes a wall member adjacent said stub, said stub having a radial projection forming part of said preventing means and said wall member having an aperture which permits entry of said stub and of said radial projection only in said predetermined angular position of said eccentric.

23. The connector of claim 15, wherein said coupling member is movable to and from an extended position in response to turning of said eccentric to and from said predetermined angular position, said preventing means including at least one stop provided in said housing and arranged to permit depression of said portion of said eccentric into said housing only in said predetermined angular position of said eccentric.

24. The connector of claim 23, wherein said biasing means is an integral part of said coupling member and said coupling member overlies said at least one stop in response to movement away from said extended position.

25. The connector of claim 24, wherein said end portion overlies said at least one stop in response to movement of said coupling member from said extended position.

26. The connector of claim 15, wherein said coupling member has a plate-like portion adjacent said end portion and receiving a second portion of said eccentric, said end portion forming a closed loop and including a leg which extends through said opening and includes said second projection, said housing having a wall member and said preventing means including said leg and a portion of said wall member.

27. The connector of claim 26, wherein said plate-like portion and said end portion share the axial movements of said eccentric and said coupling member is movable to and from an extended position in response to turning of said eccentric to and from said predetermined angular position, said leg having an end face which is overlapped by said portion of said wall member in response to movement of said coupling member from said extended position so that the wall member then prevents depression of said eccentric.

28. The connector of claim 27, wherein said wall member has a recess which permits entry of said leg in the extended position of said coupling member.

29. The connector of claim 28, wherein said leg has a predetermined thickness and said recess is a slot having a width which closely approximates said thickness.

30. The connector of claim 1, wherein said housing includes a wall member having a recess for said end portion.

31. The connector of claim 30, wherein said coupling member is movable to and from an extended position in response to turning of said eccentric to and from said predetermined angular position, said end portion extending into said recess at least in the extended position of said coupling member, said wall member having a front side and said end portion having a front side which is substantially flush with the front side of said wall member at least when said coupling member is out of said extended position.

* * * * *